Figure 3:
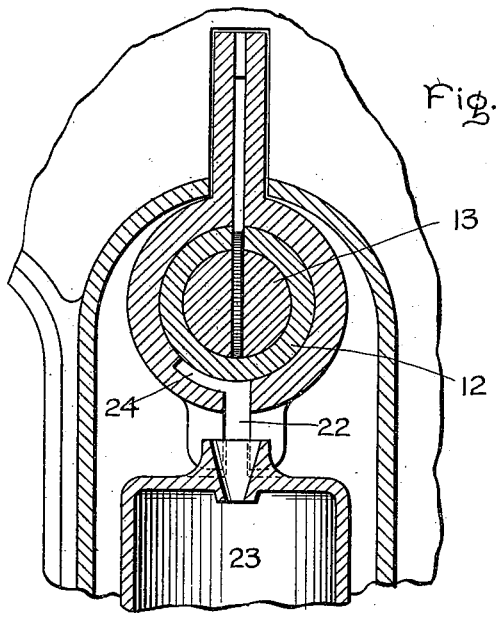

No. 667,070.　　　　　　　　　　　　　　　Patented Jan. 29, 1901.
F. P. COX.
PREPAYMENT ELECTRIC METER.
(Application filed Oct. 12, 1899.)
(No Model.)　　　　　　　　　　　　　　　　　2 Sheets—Sheet 1.
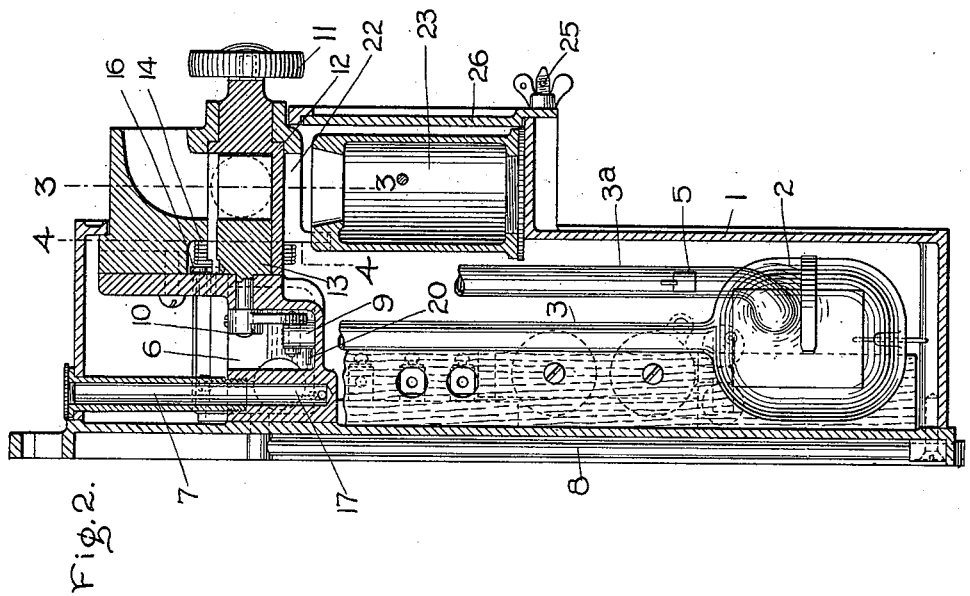
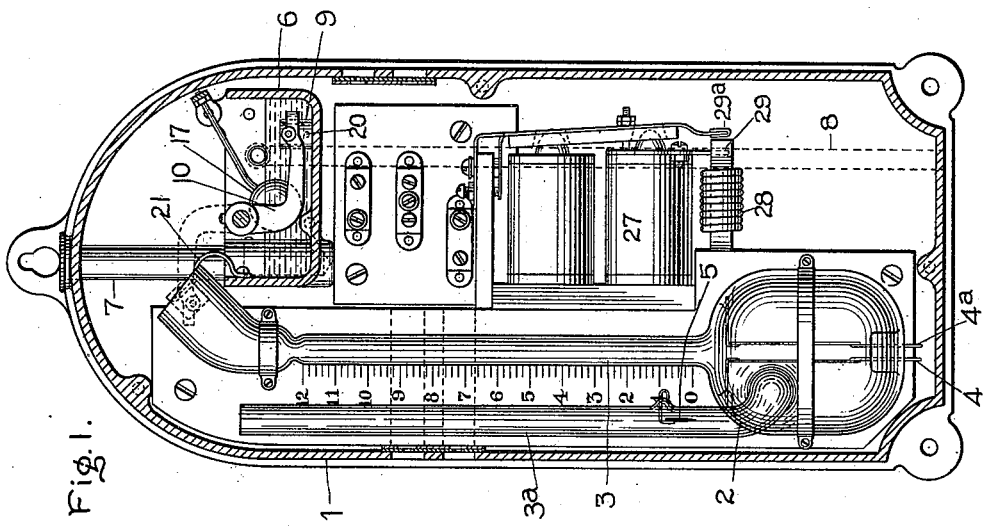
Witnesses.
Arthur H. Abell.
A. F. Macdonald.
Inventor
Frank P. Cox.
by Albert G. Davis
Atty.

No. 667,070.  
F. P. COX.  
PREPAYMENT ELECTRIC METER.  
(Application filed Oct. 12, 1899.)

Patented Jan. 29, 1901.

(No Model.)  
2 Sheets—Sheet 2.

Witnesses.
Arthur H. Abell.
A. F. Macdonald.

Inventor
Frank P. Cox.
by Albert G. Davis
Atty.

UNITED STATES PATENT OFFICE.

FRANK P. COX, OF LYNN, MASSACHUSETTS, ASSIGNOR TO THE GENERAL ELECTRIC COMPANY, OF NEW YORK.

PREPAYMENT ELECTRIC METER.

SPECIFICATION forming part of Letters Patent No. 667,070, dated January 29, 1901.

Application filed October 12, 1899. Serial No. 733,341. (No model.)

*To all whom it may concern:*

Be it known that I, FRANK P. COX, a citizen of the United States, residing at Lynn, in the county of Essex, State of Massachusetts, have invented certain new and useful Improvements in Prepayment Electric Meters, (Case No. 1,244,) of which the following is a specification.

This invention relates to electric meters of that kind which govern the amount of electric energy admitted to supplied premises according to the value of toll paid by the consumer. This type of meter is commonly called a "prepayment-meter."

The object of the invention is to simplify and cheapen the construction of such devices.

In carrying out my invention I make use of the principle of electrolytic decomposition by interposing in the path of the supplied current, or of a current in definite relation thereto, a body of electrolyte which under the principle referred to is chemically decomposed in direct proportion to the volume of energy consumed by the metered translating devices. As the liquid is decomposed its level is altered, and when a definite predetermined difference of level is attained I cause a circuit-breaker to be operated to disconnect the translating devices from the mains of the supply-circuit.

My invention comprises, in connection with such an organization, general means for restoring the relation of the controlling device of the circuit-breaker to the level of the electrolyte, so as to put the apparatus again in its initial condition after a coin of determinate value or other representative of value, such as a token, has been paid to the machine, thereby permitting the supply of current to be continued again until the value of the payment in energy has been consumed by the translating devices, when the change of level of the electrolyte will again cut out the translating devices. I employ a specific means of restoring the level of the electrolyte which I have found to be effective in practice. This consists, broadly speaking, of means for adding fresh portions of liquid or electrolyte to the cell to compensate for that disintegrated or decomposed by the action of the current. This is withdrawn from a reservoir, which may be filled from time to time, and is so arranged that the handle or other operating device which controls the replenishment of the electrolyte cannot affect the same except when a coin or similar representative of value is paid to the machine.

The invention embraces various features of novelty, which will be hereinafter more fully described and claimed.

Figure 4:
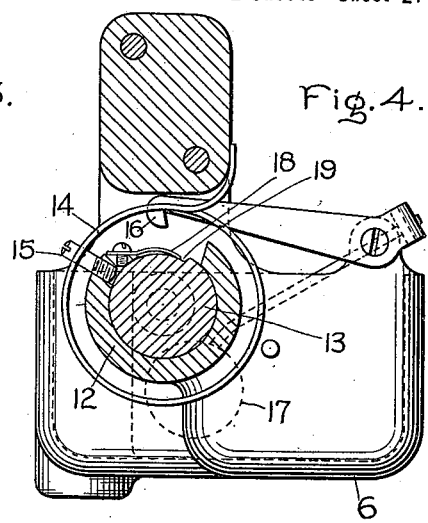
Figure 5:
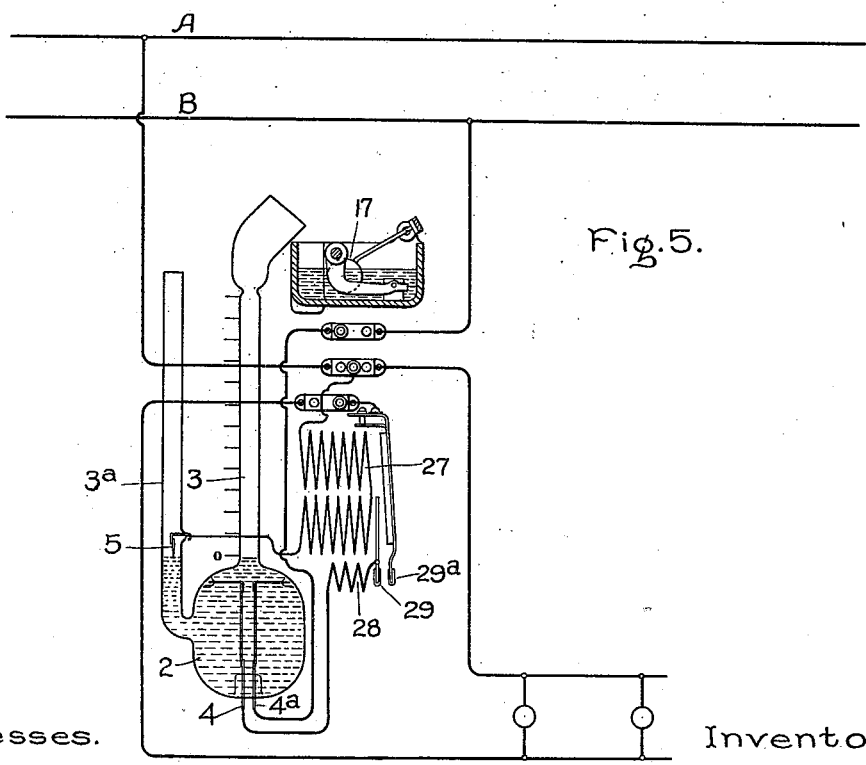

In the accompanying drawings, which illustrate the invention, Figure 1 is a vertical sectional view of an apparatus embodying my improvements. Fig. 2 is a section on a plane at right angles to that shown in Fig. 1. Fig. 3 is a detail sectional view on a plane indicated by the line 3 3 of Fig. 2. Fig. 4 is a detail sectional view on a plane indicated by the line 4 4, and Fig. 5 is a diagram showing the relation of the governing and consumption circuits to the apparatus.

Referring to the drawings, 1 represents a cast-metal casing containing the operative parts of a prepayment-meter constructed in accordance with my invention. It will be unnecessary to describe its construction in detail, as it may be widely varied in practice, and its particular arrangement forms no essential feature of the invention. Within the casing, on a suitable support, is mounted an electrolytic cell 2, provided with a long tubular stem or neck 3 and an enlarged mouth at the top. Within the cell is mounted a pair of platinum electrodes in the form of plates to offer a good path for the current passing to the translating devices on the consumer's premises. The cell may be conveniently formed of glass and the electrodes firmly supported in position by braces of platinum fused into the glass and leading-in wires 4 $4^a$, fused into the bottom. An auxiliary electrode 5 is supported in a parallel tube $3^a$ in open communication with the lower part of cell 2 and at a point near the level of the constricted neck and is provided with a conductive terminal on the outside of the bulb. The relation of these parts will be understood from an inspection of Fig. 5, where it will be seen that the electrodes 4 and 4ª are in circuit with the translating devices. The apparatus may be calibrated by providing a number of equidistant divisions, provided the neck is tubular, extending from the level of the lowest point of the electrode 5 vertically along the tube. In the upper part of the apparatus is supported a reservoir 6 of acidulated water or a saline solution which may be supplied from time to time through a tube 7, extending to the outside of the casing and provided with a screw-cap, as indicated in Fig. 1, and an overflow-pipe 8, by which any excess over the desired level will be withdrawn from the apparatus. In the reservoir 6 is pivoted a bucket 9, mounted on the end of the lever 10, by which a fresh supply of electrolyte may be added to the tube 3 when a coin or token has been deposited in the apparatus. The operation of this device is effected by a handle 11, controlling a tubular shaft 12, socketed within which and movable with relation to which is a shaft 13, to which is secured the lever 10, which controls the feed-bucket 9. The shafts 12 and 13 are provided with coöperating slots, as seen in Figs. 2 and 3, one side only of the tubular shaft being slotted. The slot may, however, extend entirely through the solid shaft 13, as seen in Fig. 3.

The apparatus shown in the drawings is designed to be controlled by a twenty-five-cent piece and permits the coin to drop through the inner shaft when the two shafts are brought into such relation that the slots aline, as indicated in Fig. 3. The tubular shaft is controlled by a coil-spring 14, one end of which is fastened to a fixed portion of the frame and the other end to a set-screw 15, lagged into the tubular shaft. The inner end of the tubular shaft is notched or slotted to permit a detent 16, carried on the end of a lever pivoted to the tank and controlled by a float 17 to drop into engagement and lock the apparatus out of operation when the level of the liquid in the reservoir is too low to permit the full supply to the tube. A leaf-spring 18, fastened to the end of the tubular shaft, bears upon the inner shaft 13 at a point a short distance from a notch 19, where the slots aline, the function of which will presently be described. The bucket 9 is provided with a stud or pin 20, which comes in contact with a fixed stop 21 when a coin has been deposited and the handle turned, thus tipping the bucket and emptying its contents into the tube 3; but during this range of movement the coin, which locks together the tubular shaft 12 and the solid shaft 13, has been shifted through an angle of one hundred and eighty degrees, bringing the coin into alinement with a duct 22, leading into a cash-box 23. At this moment the bucket has been brought into engagement with the stop 21 and is tilted thereby, arresting the movement of the shaft 13. The parts are so arranged that in this position there is no, or but little, disposition of the bucket-controlling shaft 13 to return to its original position. When, therefore, the handle is released, the tension of the spring takes up the free motion between the end of the leaf-spring 18 and the wall of the notch 19, thus releasing the coin and permitting it to drop into the cash-box. The tension of the spring then returns all the parts, including the bucket, to normal position, and a fresh charge of electrolyte cannot be made until the deposit of another coin or token.

I provide a recess 24 in the shaft-support adjacent to the slot 22, leading to the cash-box. This prevents the return of the coin to its original position in case its fall into the cash-box should be obstructed. The advantage of this is obvious, as otherwise the return of the coin to its original position would permit a second charge of electrolyte to be admitted to the tube, for which the company would have no equivalent.

Admission to the cash-box may be controlled by a thumb-screw retained by a padlock passed through a hole 25 in a stem or pin passing through the door 26.

27 is a circuit making and breaking electromagnet, and 28 a blow-out magnet for extinguishing the arc formed at the contacts during the rupture of the circuit of the translating devices.

The operation of the electric portion of the apparatus will be clearly understood from an inspection of Fig. 5, from which it will be seen that starting from the main B current enters the apparatus at the electrode 4ª, passes through the electrolyte and out at electrode 4, thence through the blow-out magnet 28 and by the contacts 29 29ª to the translating devices and back to main A. The action of the circuit-breaker is controlled by a derived circuit from electrode 4ª, through the electrolyte to electrode 5, through the coils on electromagnet 27 to main A. It will be seen that the integrity of this circuit is determined by the position of the electrolyte in the tube 3. So long as any liquid stands above the level of the lower tip of the electrode 5 the electromagnet 27 will be energized and the circuit through the contacts 29 29ª will be completed. The translating devices will therefore be in a position to draw current. When, however, the value of the coin in energy has been exhausted, the decomposition of the electrolyte lowers its level to the zero-point on the scale, opening it at the tip of 5, thereby demagnetizing the circuit-breaker, permitting the contacts 29 29ª to open, the spark or arc being simultaneously extinguished by the action of the blow-out magnet 28. The consumer's translating devices must therefore remain out of action until another payment has been made to the machine and an addition to the supply of electrolyte permits the electrode 5 to be covered, thereby energizing the magnet 27 and again closing the circuit.

In order to reduce the sparking at terminal 5 to a minimum, as well as to cut down the waste of current, the electromagnets 27 are wound to a high resistance, and, if desired, additional resistance may be inserted in the branch. I find the best results are attained when the electrode 5 is out of the path of the gas-bubbles resulting from electrolysis, which cause disturbance of level in tube 3. I therefore employ the lateral tube $3^a$ in open communication with the bulb of the cell, as shown in the drawings.

What I claim as new, and desire to secure by Letters Patent of the United States, is—

1. A prepayment-meter comprising a body of electrolyte, electrodes therefor in circuit with the consumers' translating devices, whereby the level of the electrolyte is altered proportionally to the energy consumed, a circuit-breaker actuated at a determinate level of the electrolyte, and toll-controlled mechanism for restoring the relation of the electrolyte and the circuit-breaker after a definite period of operation.

2. A prepayment electric meter comprising an electrolyte in the consumption-circuit, a circuit-controller for interrupting the circuit when a determinate quantity has been electrolyzed, and a toll-controlled device for replenishing the electrolyte.

3. A prepayment electric meter comprising an electrolyte in the consumption-circuit, an electrode at a definite level therein, a circuit-breaker for the consumption-circuit, controlled by said electrode, and a toll-controlled device for raising the level.

4. A prepayment electric meter comprising an electrolytic cell containing electrodes in circuit with the translating devices, a branch circuit including an auxiliary electrode on a higher level, a circuit-breaker in said branch circuit, and a toll-controlled device for raising the level of the liquid.

5. A prepayment electric meter comprising an electrolytic cell having an open tubular neck, the electrolyzing-electrodes being in circuit with the consumers' translating devices, an auxiliary electrode at a definite level in the cell included in a branch circuit controlling a circuit-breaker, a reservoir, and toll-controlled devices for replenishing electrolyte when consumed by decomposition.

6. A prepayment electric meter comprising an electrolytic cell having electrodes in circuit with the consumers' translating devices toll-controlled devices for starting the meter and an auxiliary electrode in a branch circuit controlling a circuit-breaker, said electrode being out of the path of escaping gas-bubbles.

7. A prepayment electric meter comprising an electrolytic cell having a tubular neck open to the atmosphere, the electrolyzing-electrodes being in circuit with the consumers' translating devices, an auxiliary electrode in a branch circuit supported in a lateral tube connected with the cell out of the path of escaping gases, a circuit-breaker controlled by said electrode, and toll-controlled devices for replenishing the electrolyte.

8. A prepayment electric meter comprising an electrolytic cell in circuit with the consumers' translating devices, an auxiliary electrode at a determinate level therein in a branch circuit, a circuit-breaker controlled thereby, a blow-out magnet in said circuit, and toll-controlled devices for replenishing the decomposed electrolyte.

9. A prepayment electric meter comprising a tubular electrolytic cell in circuit with the consumers' translating devices, means for opening the circuit at a predetermined level, a supply-opening in the cell, a supply-reservoir, and a toll-controlled device for transferring a definite charge of electrolyte from the reservoir to the cell.

10. A prepayment electric meter comprising an electrolytic cell in circuit with the consumers' translating devices, means for opening the circuit at a predetermined level, a supply-reservoir, a bucket for recharging the cell, and a toll-controlled handle for operating the bucket.

11. A prepayment electric meter comprising an electrolytic cell in circuit with the consumers' translating devices, means for opening the circuit at a predetermined level, toll-controlled devices for transferring a definite charge of electrolyte from the reservoir to the cell, and supply and overflow pipes for the reservoir.

12. A prepayment electric meter comprising an electrolytic cell in circuit with the consumers' translating devices, means for opening the circuit at a predetermined level, toll-controlled devices for transferring a definite charge of electrolyte from the reservoir to the cell, and means for locking out the toll devices when the level of the reservoir is too low to furnish a charge.

13. A prepayment mechanism for a vending-machine, comprising a tubular shaft governed by a handle outside of the inclosure containing said mechanism, a secondary shaft within the said tubular shaft, a coin-slot common to both, a coin-duct above the shafts, a cash-box below the same, and means for locking the shafts against backward rotation until the coin is dropped into the box.

14. A prepayment mechanism for a vending-machine, comprising a tubular shaft governed by a handle outside of the inclosure containing the mechanism, a secondary shaft within the tubular shaft, a coin-slot common to both, a coin-duct above the shafts, a cash-box below the same, and a stop to engage the coin and prevent the return of the shaft after a definite range of movement until the coin drops therefrom.

15. Prepayment mechanism for vendingmachines, comprising a tubular shaft governed by a handle outside, a secondary shaft within the latter, a coin-slot common to both, a coin-duct above the shafts, a cash-box below the same, and a slip connection between the shafts to permit relative movement by lost motion in one direction to release the coin.

In witness whereof I have hereunto set my hand this 10th day of October, 1899.

FRANK P. COX.

Witnesses:
ALEX. F. MACDONALD,
DUGALD MCKILLOP.